Feb. 3, 1970 R. R. COSNER ET AL 3,493,148

DISPENSING APPARATUS

Filed Feb. 24, 1967

INVENTORS
ROBERT R. COSNER
HENRY H. HART
HENRY J. JAHNES
BY Robert J. Eichelberg
ATTORNEY

United States Patent Office 3,493,148
Patented Feb. 3, 1970

3,493,148
DISPENSING APPARATUS
Robert R. Cosner, South Charleston, and Henry H. Hart and Henry J. Jahnes, St. Albans, W. Va., assignors to Union Carbide Corporation, a corporation of New York
Filed Feb. 24, 1967, Ser. No. 618,440
Int. Cl. B67d 5/54; G01f 11/10
U.S. Cl. 222—194                    5 Claims

ABSTRACT OF THE DISCLOSURE

The disclosure relates to an apparatus comprising two enclosed pistons one driven and one driving connected to each other by means of a telescoping link. When the driving piston attached directly to a connecting rod is caused to move away from the at rest position of the driven piston the link permits the pistons to separate a predetermined distance. The void thus formed between the pistons, comprises a metering chamber and may be filled with a dispensible material through a feeding chamber in the enclosure. As the driving piston continues to move, the telescoping linkage pulls the driven piston. The void between the pistons enters a cylindrical bore between the feeding chamber and an effluent chamber and a finite pocket is formed for the transport of the dispensible material. At the end of the driving piston travel the pocket is fully exposed to an effluent chamber cut through the enclosure in which the pistons are mounted and the dispensible material passes out of the chamber.

Figure 1:
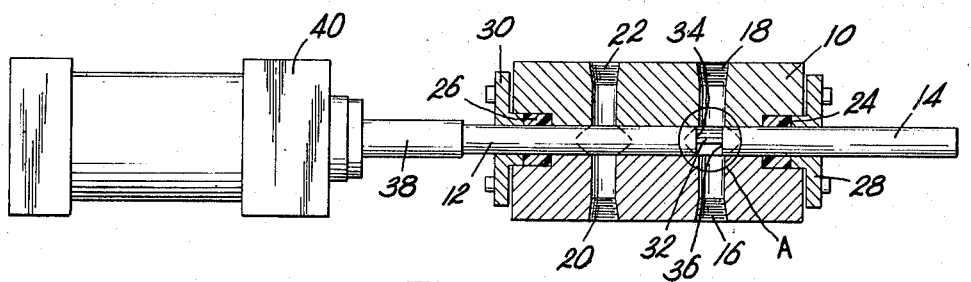

On the return stroke the driving piston moves towards the driven piston and the telescoping linkage retracts into the driven piston. This relative movement continues until the piston faces are in contact and there is no longer a void between them. The driven piston is pushed to the end of the stroke and the cycle started again.

---

The present invention relates to a dispensing apparatus; more particularly a dispensing apparatus for the continuous injection of a flowable solid, fluid or a suspension of a solid in a fluid and especially relates to the precise dispensing of quantities of a solid dispersed in a fluid carrier from one closed system into another.

For some time there has been a need in the art for apparatus suited to transferring granular solids, fluids, e.g. liquids or gases, slurries or suspension of solids in fluids of various compositions and concentrations and physical properties from one closed system to another. The exigencies of the art indicate that such a device should be capable of metering known quantities. Additionally, dispensing apparatus of this type should be capable of metering at pre-set and uniform rates for extended periods of time, as well as meter a uniformly dispersed and representative fraction of the total slurry supply consistently. Lastly, many difficulties have been encountered in metering at rates and volumes commensurate with the scale of application.

Previous attempts to solve slurry metering problems using commercially available ball-check or modified check valve-positive displacement pumping systems, solenoid valves, or other configurations in combination with diverse programming arrangements all have ordinarily failed for several reasons.

One source of failure is that the positive displacement pump check valves failed to seat properly because of solids deposition or interference within the valve body thereby resulting in leakage and loss of or erratic pumping action. Furthermore the accumulation and buildup of solids under check valve, solenoid valve and diaphragm valve seats caused by impact, entrapment or stickiness resulted in failure of the device. This was primarily due to the fact that the valve could not close completely due to the deposition of solids on the valve seat or on valve stems in the case of poppet valves. Additionally, systems of this type were found to be incapable of metering a representative slurry concentration at uniform rates at the point of injection and accordingly gave poor results. Furthermore, the valve systems formerly used were relatively inflexible to changes in reaction rates and accordingly were limited as metering devices.

It is therefore an object of this invention to overcome these and other difficulties encountered in the prior art.

Accordingly, the present invention relates to a novel apparatus comprising means for shunting the flow of both a flowable solids or dispersed slurry system and a second process stream through a special housing or metering block. The axes of flow of the two streams through this block intersect the axis of travel of a plunger which may be laterally displaced within the block in a cylindrical enclosure and accordingly the plunger can be programmed to transfer unidirectionally from the slurry to the process stream. In order to avoid reciprocate transfer from the process stream back into the dispersed slurry stream, a collapsible chamber is formed by utilizing two plungers in tandem connected by a telescoping or collapsible linkage. The apparatus may also be designed so that the chamber will collapse either in a linear direction or alternately in a rotational direction, the former being preferred.

Figure 2:
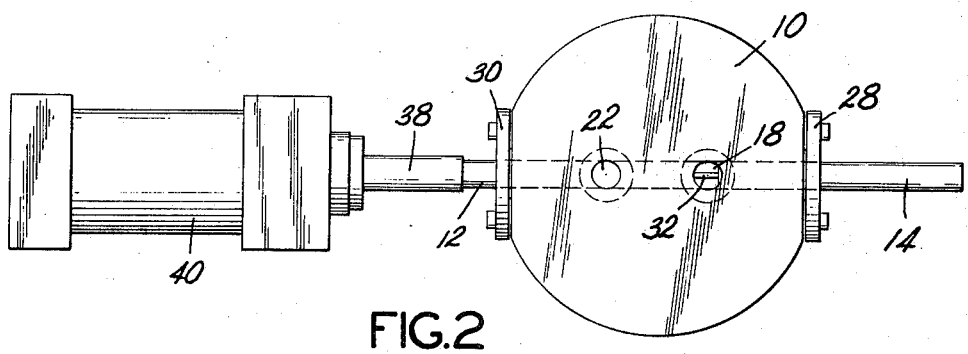
Figure 3:
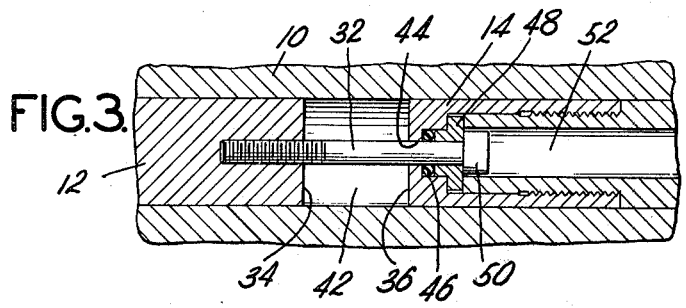
Figure 4:
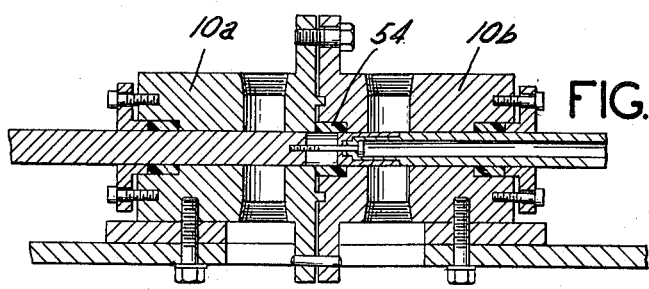

In order to better understand how these and other objects of the present invention are achieved, reference is made to:

FIGURE 1 showing a metering valve assembly;

FIGURE 2 showing a top view of the assembly in FIGURE 1;

FIGURE 3 which shows a cross section of FIGURE 1 taken from the section A and more particularly illustrates the telescoping linkage connecting the plungers or pistons that reciprocate within the metering chamber or enclosure; and FIGURE 4 which shows apparatus of FIGURE 1 modified to transfer material over a pressure drop.

Referring to FIGURE 1, an enclosure 10 having a cylindrical bore containing pistons 12 and 14 is provided with feeding means comprising feeding inlet port 16 and feeding outlet port 18 and effluent means comprising effluent inlet port 20 and effluent exhaust port 22. Sealing means comprising Teflon packing rings 24 and 26 or any other suitable equivalent known in the art are placed at opposite ends of the cylindrical bore whereby said rings sealingly and slidingly engage pistons 14 and 12 respectively. Rings 24 and 26 are held in place by retaining means 28 and 30 respectively, said retaining means being adjustable to compress said sealing means 24 and 26. By compressing these sealing rings the pressure at the interface of such rings and the cylinders may be increased thereby controlling seepage into or out of the enclosure 10. Pistons 12 and 14 are connected by a telescoping linkage 32 permitting face 34 of piston 12 to be spaced a fixed distance from face 36 of piston 14 and also permitting face 34 to abut piston face 36.

A connecting rod 38 is attached to piston 12 outside of enclosure 10, the connecting rod being attached to a prime mover 40 which comprises, for purposes of illustration, a double acting air cylinder for reciprocating pistons 12 and 14 along the longitudinal axis of the cylinder bore in enclosure 10.

Telescoping linkage 32 is shown in detail in FIGURE 3 wherein piston faces 34 and 36 are separated up to the limit permitted by linkage 32. Piston faces 34 and 36 form two walls of a cylindrical chamber 42, the third wall being formed by the inner walls of the cylindrical bore running through enclosure 10. Telescoping linkage 32 passes through an aperture 44 in piston 14 and terminates at linkage head 50 which freely moves in chamber 52 hollowed out of piston 14. Telescoping linkage 32 also passes through an O-ring, preferably a Teflon O-ring 46, next adjacent aperture 44, said O-ring slidingly and sealingly engaging the shaft of linkage 32. O-ring retaining means 48 abuts and adjustably compresses sealing ring 46 and also provides a seat for link head 50 so that telescoping linkage 32 will not be pulled through aperture 34 when piston faces 34 and 36 are moved away from one another.

During the operation of the feeding device of the present invention a "loop-reactor" is connected to effluent means 20 and 22 in a conventional manner whereas a second loop containing feeding material is connected to feeding means 16 and 18. Reactants are circulated through effluent means 20 and 22 in a conventional manner and material to be fed into the reaction loop fed through the feeding means comprising openings 16 and 18. Pistons 12 and 14 are moved into position by prime mover 40 acting through connecting rod 38 wherein piston 12 in the illustration of the invention may be considered a driving piston and piston 14 a driven piston. Thus when piston 12 is moved in the direction of piston 14 telescoping linkage 32 in effect collapses so that piston face 34 abuts piston face 36 and the force applied to driving piston 12 in turn is transmitted to piston 14 and both pistons are moved in the direction of the driven piston 14. The length of travel of connecting rod 38 in the direction of piston 14 is adjusted so that piston face 36 is aligned in a feeding relationship with feeding means comprising the chamber terminating in openings 16 and 18. Once piston face 36 is positioned in a feeding relationship connecting rod 38 is caused to reverse and drive in the direction of driven piston 12.

Thus by moving connecting rod 38 in the direction of driving piston 12 telescoping linkage 32 permits piston face 34 to separate from piston face 36, the amount of such separation being controlled by the telescoping linkage 32. By moving connecting rod 38 in the direction of the driving piston, piston faces 34 and 36 are sufficiently separated so as to allow passage of a fluid a granular solid or a suspension of a solid in a fluid across the faces 34 and 36. When connecting rod 38 is moved further in the direction of driving piston 12, the telescoping linkage 32 draws driven piston 14 in the same direction and a cylindrical metering chamber 42 is formed, piston faces 34 and 36 forming the closed ends of the chamber whereas the inner walls of the cylindrical bore in enclosure 10 form the continuous wall of the cylindrical chamber 42. Connecting rod 38 is then moved further in the direction of the driving piston 12 so that piston face 34 is moved into and through effluent means comprising the chamber terminated by ports 20 and 22, whereupon a fluid in a loop type reactor passes through said effluent means dragging a material entrained in chamber 42 through port 22. Connecting rod 38 is then moved in a direction towards driven piston 14 thereby causing telescoping linkage 32 to collapse and piston faces 34 and 36 to abut one against the other and also causing piston 12 and 14 to be moved in the direction of driven piston 14 whereupon the cycle is begun again.

A chamber means 42 in one embodiment of the invention is formed by piston faces 36 and 34 forming opposite ends respectively or a cylindrical chamber whereas the cylindrical bore in enclosure 10 forms the third or continuous wall of the cylindrical chamber. It is intended however that the present invention should not be limited to this chamber and that equivalent collapsible chambers ae included within the broad scope of the apparatus described herein. In this particular embodiment however the outer extremities of the void formed when the piston faces 34 and 36 are separated within the cylindrical bore in enclosure 10 may be considered as port means for venting the collapsible dispensing or metering chamber thus formed.

The apparatus of FIGURE 4 is substantially the same as that of FIGURE 1 with the exception that sealing means 54 is provided in the cylindrical bore in enclosure 10 intermediate said effluent and feeding means. The apparatus of FIGURE 4 also differs in that enclosure means is divided into two sections comprising portion 10a and portion 10b which are separable and may be adjustably joined one to the other so as to apply pressure to sealing ring 54. It should be noted that the devices in FIGURE 4 is especially suited to transferring or metering fluids across a pressure drop, especially where the pressure in the effluent means is appreciably higher than that in the feeding means. The apparatus of FIGURE 4 may also be operated where the feeding and effluent pressures are the same. Although the apparatus of FIGURE 1 may be similarly operated it is preferred that there is substantially no pressure drop across the feeding and effluent means. In any event the operation of the apparatus in both FIGURE 1 and FIGURE 2 may be carried out at atmospheric, subatmospheric or superatmospheric pressures.

Although the feeding means comprising inlet port 16 and outlet port 18 and effluent means comprising inlet port 20 and outlet port 22, have been shown in FIGURE 1, it is within the scope of the present invention to provide such feeding and effluent means by forming only one influent port and one effluent port in the enclosure 10, both ports intersecting the cylindrical chamber running the length of enclosure 10. When, however the feeding means and effluent means is as shown in FIGURE 1 it is preferred that the cross sectional area of such feeding means and effluent means is greater than the cross-sectional area of the piston faces so as to provide means for allowing the feed streams and effluent streams to continuously flow through the body of metering device no matter what the position of the plunger during the metering cycle or when the metering device is shut down. In its broadest aspect however feeding and effluent means may be of any size sufficient to allow material to flow through these means.

In addition to employing a metering device of the invention for feeding material from a loop feeding means to a loop reactor, the apparatus of the invention may be employed in any application requiring the transfer of solids or a dispersion of solids in fluids, especially in such applications requiring metering known quantities from a slurry from one closed system into another, metering at pre-set and uniform rates for extending periods of time, metering a uniformly dispersed and representative fraction of a total slurry supply, and metering at rates and volumes commensurate with the scale of application. The valve of the present invention is useful for metering slurries or liquids as well as finely divided solids such as calcium amide on a silica base.

In summary, the present invention comprises two enclosed pistons one driven and one driving connected to each other by means of a telescoping link. When the driving piston attached directly to a connecting rod is caused to move away from the at rest position of the driving piston the link permits the pistons to separate a predetermined distance. The void thus formed between the pistons, comprises a metering chamber and may be filled with a dispensible material through a feeding chamber in the enclosure. As the driving piston continues to move, the telescoping linkage pulls the driven piston. When the void between the pistons enters a cylindrical bore between passages a finite pocket is formed for the transport of the dispensible material. At the end of the driving piston travel the pocket is fully exposed to an effluent chamber cut through the enclosure in which the pistons are mounted and the dispensible material passes out of the chamber.

On the return stroke the driving piston moves towards the driven piston as the telescoping linkage retract into the driven piston. This relative movement continues until the piston faces are in contact and there is no longer a void between them or stated otherwise this movement is continued until the chamber formed between the pistons collapses. As the motion of the driving piston persists, the driven piston is pushed to the end of the stroke and the next cycle is ready to commence.

What is claimed is:

1. A dispensing apparatus for metering flowable dispensible material comprising:
   (a) an enclosure comprising a cylinder;
   (b) two longitudinally displaceable pistons in said cylinder, said piston having flush fitting abutable opposed faces.
   (c) linking means for reciprocably collapsibly spacing said piston faces so that when said pistons are displaced in one direction and said faces are separated and when said pistons are displaced in the opposite direction, said faces abut one another, a displaceable chamber being formed in said cylinder when said piston faces are separated; said linking means being within said chamber; said linking means also fixing the extent to which said chamber is openable and for enabling said chamber to collapse.
   (d) effluent means for emptying said chamber of dispensible material comprising at least two effluent ports in said cylinder, the longitudinal axes of said effluent ports lying in a common plane with one another and feeding means for introducing a dispensible material into said chamber means through said cylinder and out of said cylinder, said feeding means comprising at least two feeding ports in said cylinder, said feeding ports having longitudinal axes lying in a common plane with one another, said chamber being displaceable into a feeding relationship with said feeding means and into a discharge relation with said effluent means;
   (e) means for longitudinally reciprocating said chamber into a feeding relationship with said feeding means and a discharge relationship with said effluent means in one direction and collapsing said piston faces when displaced in an opposite direction.

2. The apparatus of claim 1 where said means for collapsibly spacing said piston faces comprises a telescoping linkage, the ends of said linkage being fixed in a collapsing relationship to said piston faces.

3. The apparatus of claim 2 where said means for longitudinally reciprocating said chamber comprises a connecting rod drivingly engaging one of said pistons through an opening in the end of said cylinder, said opening having a seal which slidingly engages said connecting rod.

4. The apparatus of claim 3 where said pistons are a length at least equal to the distance between said feeding means and said effluent means.

5. The apparatus of claim 4 comprising an annular seal in said cylinder intermediate said feeding means and said effluent means, said annular seal slidingly and sealingly engaging said pistons.

References Cited

UNITED STATES PATENTS

| | | | |
|---|---|---|---|
| 840,686 | 1/1907 | Brooke | 222—361 X |
| 1,870,188 | 8/1932 | Abrams | 222—361 X |
| 3,160,015 | 12/1964 | Charlton et al. | 73—422 |
| 3,201,001 | 8/1965 | Roberts et al. | 222—194 |
| 3,285,669 | 11/1966 | Clark | 222—361 X |
| 3,330,311 | 7/1967 | Christine et al. | 222—361 X |

SAMUEL F. COLEMAN, Primary Examiner

U.S. Cl. X.R.

222—361